Sept. 28, 1965 N. H. YOUNG, JR 3,209,260

BEYOND-THE-HORIZON COMMUNICATION SYSTEM FOR AIR VEHICLES

Filed March 16, 1961

INVENTOR.
NORMAN H. YOUNG, JR.

BY Alfred C. Hill

AGENT 3,209,260
BEYOND-THE-HORIZON COMMUNICATION SYSTEM FOR AIR VEHICLES

Norman H. Young, Jr., Nutley, N.J., assignor to International Telephone and Telegraph Corporation, Nutley, N.J., a corporation of Maryland Filed Mar. 16, 1961, Ser. No. 96,322
6 Claims. (Cl. 325—56)

Figures 1, 2:
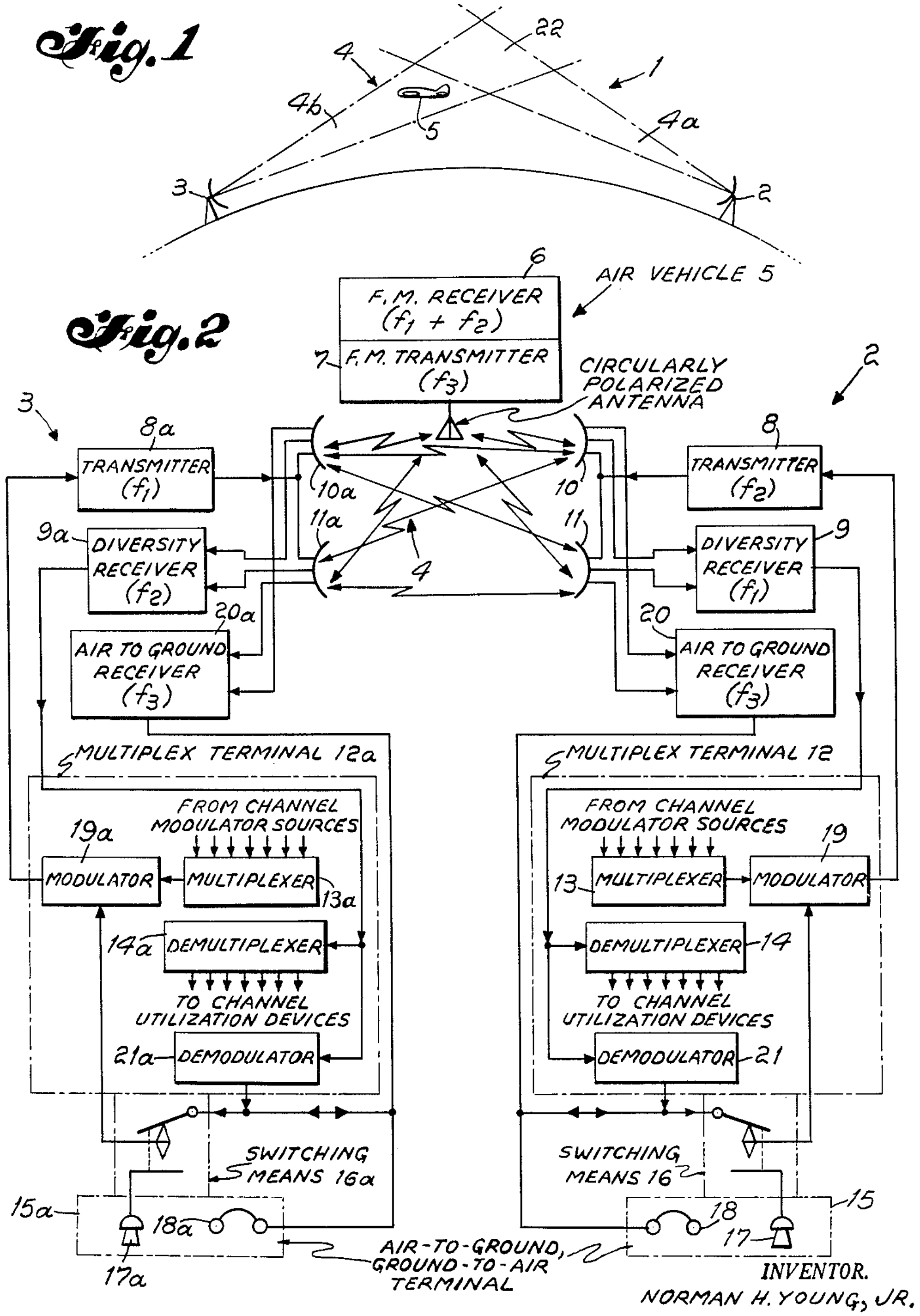

This invention relates to communication systems and more particularly to a system for communication with air vehicles.

Communication with air vehicles, such as aircraft and space vehicles, is usually carried on by a communication system including a ground station and an airborne station specifically designed and used solely for this purpose. As air and space travel increases, it will be necessary to establish more of these communication systems and utilize more of the already crowded radio frequency spectrum for air vehicle communication.

Therefore, an object of this invention is to provide a system for communication with air vehicles resulting in a reduction of communication equipment and conservation of radio frequency spectrum.

Another object of this invention is to provide an arrangement in cooperation with an existing point-to-point communication system for communication with an air vehicle.

The point-to-point communication system utilized in the air vehicle communication system of this invention may be of the line-of-sight, ionospheric scatter, or tropospheric scatter type. It is foreseeable that the existing communication system need not be restricted to a ground-to-ground communication system. Two space platforms interconnected by a communication system could cooperate in accordance with the principles of this invention to provide communication from at least one of the space platforms to a space vehicle.

In accordance with the principles of this invention the transmission signal, such as the baseband, of at least one terminal of an existing comunication system is modulated, for instance, frequency modulated, with information for an air vehicle within, or at least in a communication relationship with the transmission path of the existing communication system. The modulated transmission signal is transmitted from the one terminal to the other terminal of the existing communication system. The other terminal includes therein an arrangement to receive the modulated transmission signal and retransmit the information carried thereon to insure that the air vehicle receives this information from either or both of the terminals. Transmission from the aircraft is accomplished by modulating an airborne transmitter with the information and transmitting the modulated information in the existing transmission path. At least one of the terminals will receive the information from the aircraft and retransmit this information via the existing transmission path to the other terminal of the existing communication system to insure that the terminal with which the air vehicle wishes to communicate receives the information from the vehicle.

The above-mentioned and other features and objects of this invention will become more apparent by reference to the following description taken in conjunction with the accompanying drawings, in which:

FIG. 1 is a diagrammatic illustration of an existing point-to-point communication system and its relationship to an air vehicle with which communication is desired in accordance with the principles of this invention; and FIG. 2 is a schematic diagram in block form of a communication system in accordance with the principles of this invention.

Referring to FIG. 1, there is illustrated therein an existing point-to-point communication system 1 having terminals 2 and 3 and a transmission path 4 therebetween. System 1 is illustrated and described for purposes of explanation as a tropospheric scatter communication system, but this explanation is not meant to limit the invention to this type of communication system. The components of system 1 to establish communication between terminals 2 and 3 are conventional. Communication with air vehicle 5 disposed within, or at least in a communication relationship with transmission path 4, and, hence, at least one of terminals 2 and 3, is provided by additional equipment in a cooperative association with the conventional equipment of terminals 2 and 3.

Referring to FIG. 2, the system of this invention operates basically as follows. Information for transmission to an air vehicle modulates the transmission signal of system 1. The modulated transmission signal is transmitted to air vehicle 5 for reception in receiver 6. In accordance with a more specific aspect of the system of this invention, the baseband signal of system 1 is frequency modulated by the information to be transmitted to the air vehicle 5. Receiver 6 is compatible with the frequency and type of modulation used to receive the signal transmitted along path 4. Air vehicle 5 includes transmitter 7 to transmit information to at least one terminal of system 1. Transmitter 7 operates at a different frequency than the frequency of system 1 to prevent interference and capture effects in the air vehicle 5.

In order to insure maintenance of communication between a given one of terminals 2 and 3 and air vehicle 5, regardless of the communication relationship therebetween, terminals 2 and 3 are disposed in a closed loop relationship with respect to the information sent to and received from air vehicle 5. This information for air vehicle 5 is transmitted from both terminals to insure receipt of the information by air vehicle 5 and information transmitted from air vehicle 5 is received by either or both of terminals 2 and 3 and reverted through the closed loop to insure receipt of the information at the given one of terminals 2 and 3.

More specifically, terminals 2 and 3 each include the same equipment and will be identified by the same reference character with a letter "*a*" being placed after the equipment of terminal 3. Transmiters 8 and diversity receivers 9 carry on the conventional point-to-point communication between terminals 2 and 3. In accordance with the illustration of FIG. 2, system 1 is depicted as employing space diversity techniques due to the relationship between antennas 10 and 11 and receivers 9. It will be appreciated that the diversity techniques employed to carry on conventional scatter communication is not restricted to space diversity techniques and the system of this invention is not limited to any particular type of diversity technique. Multiplex terminals 12 supply the baseband for modulation of the carrier of transmitters 8 and act upon the received baseband to demodulate and utilize the received intelligence of system 1. The term "baseband" as employed herein is defined as the frequency band occupied by the aggregate of the transmitted signal when first used to modulate a carrier. For instance, the baseband is the frequency band employed for the transmission of picture and synchronizing signals in television and for the plural channels of a multichannel communication system. More specifically, multiplex terminals 12 are illustrated as including multiplexers 13 to provide a multichannel signal as the baseband of system 1 and demultiplexers 14 to operate upon the received baseband to separate and demodulate the multichannel signals for utilization.

In addition to the above equipment found in most communication systems, particularly of the tropospheric scatter type, air-to-ground and ground-to-air terminals 15 and switching means 16 are arranged in a particular cooperative relationship with multiplex terminals 12 to establish communication with air vehicles in accordance with this invention. Terminals 15 are illustrated symbolically to include microphones 17 and earphones 18, but may of course include any equivalent device compatible with the other components of the system. Switching means 16 may be a push-to-talk type device or a VODAS (a voice operated device, anti-singing) arrangement.

The cooperation of the various components set forth hereinabove to establish communication between one of terminals 2 and 3 and air vehicle 5 will now be described. Assume that communication is to be established between terminal 2 and air vehicle 5 in the ensuing discussion. An operator actuates switching means 16 and connects microphones 17 to modulator 19 resulting in frequency modulation of the baseband of system 1 by information destined for air vehicle 5. This modulated baseband is transmitted by transmitters 8 along transmission path 4 to terminal 3 where the modulated baseband is received by receiver 9*a*. If air vehicle 5 is in a communication relationship with that portion of path 4 directly coupled to terminal 2, that is, transmission path 4*a*, receiver 6 can receive the modulated baseband directly from terminal 2 and recover the information destined therefor for utilization therein. Air vehicle 5 may transmit information directly to terminal 2 by means of transmitter 7 when the above relationship exists between terminal 2 and air vehicle 5. This information would be received at terminal 2 on a separate receiver 20 which may be connected to either of antennas 10 or 11, or may be coupled to both as illustrated, to obtain diversity advantage. The information received in receiver 20 is coupled to terminal 15 for utilization in earphones 18.

However, as air vehicle 5 proceeds along its air route, it will leave the above communication relationship with path 4*a* and come into a communication relationship with that portion of path 4 directly coupled to terminal 3, that is, transmission path 4*b*. With this location of air vehicle 5 along path 4, there can be no direct communication between terminal 2 and air vehicle 5. The desired communication between terminal 2 and air vehicle 5 is provided by including in terminal 3 demodulator 21*a* coupled to the output of receiver 9*a* to recover the information modulating the baseband transmitted from terminal 2. This recovered information is coupled through switching means 16*a* to modulator 19*a*. Modulator 19*a* will modulate the baseband output of multiplexer 13*a* with the recovered information prior to application to transmitter 8*a*. Transmitter 8*a* will then transmit the information originated at terminal 2 to air vehicle 5 for recovery and utilization therein.

For the return transmission, that is, transmission from air vehicle 5 to terminal 2 with air vehicle 5 in a communication relationship with path 4*b*, information is modulated upon the carrier of transmitter 7, transmitted along path 4*b* and received by receiver 20*a*. The information is recovered in receiver 20*a* and coupled through switching means 16*a* to modulator 19*a*. Modulator 19*a* modulates the baseband of terminal 3 with the recovered information for propagation by means of transmitter 8*a* over path 4 to receiver 9 of terminal 2. The modulated baseband is demodulated in demodulator 21 and the resulting information, originated in air vehicle 5, is available at earphones 18.

If air vehicle 5 is in communication with both terminals 2 and 3, as occurs in zone 22 of transmission path 4, receiver 6 of air vehicle 5 will receive the information from both terminals 2 and 3. Receiver 6 may utilize a squelch circuit or a diversity selecting system to connect the better signal of the two received to the demodulator of receiver 6. Information transmitted from air vehicle

5 will be received at both terminals 2 and 3. The information received at terminal 3 in receiver 20*a* will be connected to modulator 19*a* for transmission via path 4 to terminal 2. Thus, the information originating in air vehicle 5 is available at earphones 18 from demodulator 21 as well as receiver 20. Here again a squelch circuit or diversity selecting system in connection with earphones 18 would enable utilization of the better of the two received signals.

If communication is desired from terminal 3 rather than from terminal 2, the same operation will take place as outlined hereinabove since the equipment contained in terminals 2 and 3 is identical. The only exception to this is the frequency at which the transmitters 8 and 8*a* and their companion receivers operate. The frequency difference is necessary to insure that communication from terminal 2 to terminal 3 is separated from communication from terminal 3 to terminal 2.

By modulating the baseband of system 1 with information for the air vehicle 5 in the 0–4000 cycle band, demodulation in air vehicle 5 will make information immediately audible to the pilot. Suitable filters in receiver 6 will prevent the higher channels of the multichannel system from interfering with the information modulating the baseband. With the arrangement of switching means 16 and terminals 15 when the ground operator is not talking; in other words, when switching means 16 are not operated and maintain the illustrated connection, the information received from air vehicle 5 is connected to transmitters 8 of terminals 2 or 3 so that the operator at either end of the system hears the output signals of receiver 20. Thus, if the air vehicle can be heard at either ground station his signal will be available to the operator using terminals 15 due to the loop arrangement established between terminals 2 and 3.

As mentioned hereinabove, switching means 16 can be a VODAS arrangement or a push-to-talk switch. It is preferred that a VODAS arrangement be employed to prevent the system from singing when the information to or from the air vehicles is reverted through the system 1 in a closed loop.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for communication with air vehicles comprising an existing point-to-point two way communication system for conveying intelligence in both directions between two terminals, means disposed at one terminal in said existing communication system to modulate a first intelligence of said communication system with information for an air vehicle in a communication relationship with the transmission path of said existing communication system, means to transmit said first modulated intelligence from said one terminal, means disposed in the other terminal of said existing communication system responsive to said first modulated intelligence to modulate a second intelligence of said existing communication system with said information, means to transmit said second modulated intelligence from said other terminal, and means disposed in said air vehicle to receive at least one of said first and second modulated intelligence and recover said information.

2. A system for two way communication with air vehicles comprising an existing point-to-point communication system to convey intelligence in both directions between two terminals, means disposed at one terminal in said existing communication system to modulate a first intelligence of said existing communication system with information for an air vehicle in a communication relationship with the transmission path of said existing communication system, means to transmit said first modulated intelligence from said one terminal, means disposed in the other terminal of said existing communication system to receive said first modulated intelligence, means coupled to said means to receive to modulate a second intelligence of said existing communication system with said information, means to transmit said second modulated intelligence from said other terminal, and means disposed in said air vehicle to receive at least one of said first and second modulated intelligence and recover said information.

3. A system for communication with air vehicles comprising an existing point-to-point communication system for conveying intelligence between two terminals, means disposed at one terminal of said existing communication system to modulate the intelligence of said existing communication system with first information for an air vehicle in a communication relationship with the transmission path of said existing communication system, means to transmit said modulated intelligence from said one terminal, means disposed in said air vehicle to receive said modulated intelligence and recover said first information, means disposed in said air vehicle to transmit second information to the other termianl of said existing communication system, means disposed in said other terminal to receive said second information, means disposed in said other terminal to modulate the intelligence of said existing communication with said second information and to transmit said second information to said one terminal, and means disposed in said one terminal to recover said second information.

4. A system for communication with air vehicles comprising an existing point-to-point two way communication system for conveying intelligence in both directions between two terminals, means disposed at one terminal of said existing communication system to modulate the transmission signal of said existing communication system transmitted from said one terminal with first information for an air vehicle in a communication relationship with the transmission path of said existing communication system, means disposed in the other terminal of said existing communication system to receive said transmitted first information and to modulate the transmission signal of said existing communication system transmitted from said other terminal with said first information, means disposed in said air vehicle to receive said first information from at least one of said terminals, means disposed in said air vehicle to transmit second information to said other terminal, means disposed in said other terminal to receive said second information, means disposed in said other terminal to modulate the transmission signal of said existing communication system transmitted from said other terminal with said second information, and means disposed in said one terminal to recover said second information.

5. A system for communication with air vehicles comprising an existing point-to-point communication system including two terminals and a transmission path therebetween, an air vehicle disposed in a communication relationship with at least one of said terminals, means disposed at the other of said terminals to modulate the intelligence of said existing communication system with first information for said air vehicle, means to transmit said modulated intelligence from said other terminal, means to receive said transmitted modulated intelligence at said one terminal, means disposed at said one terminal to retransmit said modulated intelligence, means disposed in said aircraft to receive said retransmitted modulated intelligence and recover said first information, means disposed in said air vehicle to transmit second information to said one terminal, means disposed in said one terminal to receive said second information and transmit said second information to said other terminal, and means disposed in said other terminal to recover said second information.

6. A system for communication with air vehicles comprising an existing point-to-point communication system including two terminals and a transmission path therebetween, an air vehicle disposed in a communication relationship with said terminals, means disposed at one of said terminals to modulate the intelligence of said communication system with first information for said air vehicle, means to transmit said modulated intelligence from said one terminal, means to receive said transmitted modulated intelligence at said other terminal, means disposed at said other terminal to retransmit said first information, means disposed in said aircraft to receive said first information from said terminals, means disposed in said air vehicle to transmit second information to said terminals, means disposed in said one terminal to receive said second information, means disposed in said other terminal to receive said second information and transmit said second information to said one terminal, and means disposed in said one terminal to utilize said second information.

References Cited by the Examiner

UNITED STATES PATENTS

| | | | |
|---|---|---|---|
| 1,894,019 | 1/33 | Buckley | 343—227 |
| 2,292,222 | 8/42 | Haigis | 325—53 |
| 2,642,524 | 6/53 | Bayliss | 325—53 |
| 2,956,276 | 10/60 | Friis | 325—26 |

OTHER REFERENCES

Dodrill et al.: Using Radio Links and Relays, Communication Engineering: vol. 14, No. 1, pages 15–17; Jan.–Feb. 1954.

DAVID G. REDINBAUGH, *Primary Examiner.*

HERMAN KARL SAALBACH, *Examiner.*